United States Patent
Walley et al.

(10) Patent No.: US 6,744,808 B1
(45) Date of Patent: Jun. 1, 2004

(54) TECHNIQUES TO INCREASE DATA TRANSMISSION RATE OF SPREAD SPECTRUM COMMUNICATIONS SYSTEMS

(75) Inventors: John S. Walley, Lake Forest, CA (US); Norman J. Beamish, Costa Mesa, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/325,107

(22) Filed: Jun. 3, 1999

(51) Int. Cl.[7] .......................... H04B 15/00; H04K 1/00; H04L 27/30
(52) U.S. Cl. ........................................ 375/146; 375/140
(58) Field of Search ................................ 375/130, 295, 375/146, 140

(56) References Cited

U.S. PATENT DOCUMENTS

| | | | | |
|---|---|---|---|---|
| 5,204,876 A | * | 4/1993 | Bruckert et al. ............. | 375/130 |
| 5,216,691 A | * | 6/1993 | Kaufmann .................. | 375/150 |
| 5,353,303 A | * | 10/1994 | Walthall ..................... | 375/145 |
| 5,541,955 A | * | 7/1996 | Jacobsmeyer ............... | 375/222 |
| 6,229,795 B1 | * | 5/2001 | Pankaj et al. ................ | 370/329 |
| 6,233,231 B1 | * | 5/2001 | Felix et al. .................. | 375/130 |
| 6,252,898 B1 | * | 6/2001 | Eto et al. .................... | 375/130 |
| 6,301,242 B1 | * | 10/2001 | Lindsay et al. ............. | 370/280 |
| 6,393,047 B1 | * | 5/2002 | Popovic' ................... | 375/140 |

* cited by examiner

Primary Examiner—Phoung Phu
(74) Attorney, Agent, or Firm—Weide & Miller, Ltd.

(57) ABSTRACT

Spread spectrum technology is being used in more and more wireless applications. Generally applications of spread spectrum include a fixed spread spectrum code size. In addition in applications that employ time domain duplex, some may employ a fixed duty cycle, for example 50% broadcast and 50% receive, for broadcast and receive functions. Many applications, such as cordless phones, also feature a fixed sampling rate for an input signal. By building systems in which these variables are not fixed but variable manufacturers can make generic type spread spectrum controllers which can be used in a variety of applications. These same circuits can also be controlled to give current devices enhanced characteristics by adjusting data rate for changing conditions, thereby enhancing their performance. By allowing the spreading code to be reduced in length, the data rate of the transmitted signal can be increased without adjusting the bandwidth of the amplifiers used to amplify the transmitted signal. Similarly, more data can be transmitted or spreading code size increased by increasing the transmit duty cycle or the number of timeslices allotted to transmit the signal. The spreading code size can also be increased by using techniques, such as reduced sampling rate, which reduce the amount of data input into the system. Conversely the spreading code length can be increased in order to achieve more range, greater interference tolerance etc. by reducing the data rate or increasing the amount of time allotted to broadcast the signal.

17 Claims, 9 Drawing Sheets

TECHNIQUES TO INCREASE DATA TRANSMISSION RATE OF SPREAD SPECTRUM COMMUNICATIONS SYSTEMS

FIELD OF THE INVENTION

The present invention relates generally to wireless spread spectrum communications systems and in particular, embodiments to such systems, processes and devices which increase the data rate and performance of spread spectrum communications.

BACKGROUND OF THE DISCLOSURE

Modern communications electronics employ a variety of schemes for using radio spectrum to communicate. For example some systems employ frequency division multiple access (FDMA) schemes, in which the frequency band is divided into a series of frequency slots and different transmitters are allotted different frequency slots.

Other systems employ Time Division Multiple Access (TDMA). In time division multiple access the time that each transmitter may broadcast is limited to a time slot. In a TDMA system the frequency upon which each transmitter transmits may be constant or may be continuously changing (frequency hopping).

Yet other systems employ the use of code division multiple access (CDMA), or spread spectrum schemes. In a CDMA system, users transmit on the same frequency band. Each CDMA system has a dedicated code that is used to separate that system's transmission from all others. These codes are commonly referred to as spreading codes, because the information density is small compared with the bandwidth size. These codes are also commonly referred to as a Pseudo Noise (PN) codes, because their seemingly random arrangement contains many of the characteristics of a pure noise signal. In a CDMA transmission, each bit of data to be transmitted is replaced by a spreading code if the data to be transmitted is a "1", and is replaced by the inverse of the spreading code if the data to be transmitted is "0".

To decode a spread spectrum transmission at the receiver, it is necessary to "despread" the code. One way to despread the code is to multiply the incoming signal, bit by bit, with the spreading code and sum the result. The process of multiplying the incoming signal bit by bit is commonly known as correlation and, upon multiplication, the signal is said to be correlated with the code. Despreading the incoming signal with a particular code involves separating the original data, encoded with that particular code, from all other CDMA transmissions, and to recover the original data. It is a property of PN codes that the presence of one PN code signal does not change the result of correlating the signal with another code. In other words the signal may be decoded using the proper PN code despite the fact that many other CDMA signals may be present. The property that one code does not interfere with the detection of the presence of another code is often referred to as orthogonality, and codes which possess this property are said to be orthogonal.

Spread spectrum has a number of benefits. One benefit of spread spectrum transmission is that, because the data transmitted is spread across the spectrum, spread spectrum can tolerate a great deal of interference. Another benefit of spread spectrum transmission is that messages can be transmitted with low power and still be decoded.

In addition to the different signal modulation techniques and frequency band utilization in wireless communication applications, various systems use different ways of timing communication between communicating units. Two basic schemes for timing communication between units are full and half duplex. When using a full duplex protocol, the communicating units can transmit and receive messages simultaneously. However, with a half duplex protocol, when one unit is transmitting the other unit is prohibited from transmitting.

In half duplex systems, the same frequency can be used for both transmission and reception, thereby enabling the transmit and receive circuitry to share many common components. In addition to the ability to share common components, half duplex schemes are further advantageous in that less isolation is required between the transmit and receive circuitry, because transmitting does not occur at the same time as receiving.

A variant of half duplex mode, which may be used in such applications as cordless phones, is Time Division Duplex (TDD). In such cordless phone systems using the TDD protocol the handset and the base unit may alternatively transmit during allotted time slices, so that the handset and the base unit do not transmit at the same time. Even though in cordless phone applications, a base station and a handset may use a Time Division Duplex protocol, TDD systems may be used to provide seemingly bi-directional communications. Speech can be compressed so that a spoken word will take less time to transmit then it does to say. Using audio compression and decompression techniques, the user perceives simultaneous bi-directional audio communications, and is unaware of the slight time delay necessary to compress and decompress the audio signal.

Problems Within the Current Art

As popularity increases for wireless communications electronics, such as cordless and cellular telephones, wireless units to transmit music to speakers or headphones, programmable digital assistants and computers with wireless links, pagers, and wireless tracking devices, the demand for cheaper, higher performance devices also increases.

Manufacturers of wireless consumer goods have improved performance, for instance, by employing spread spectrum technology in communications applications. Spread spectrum technology can enable greater range and a significant increase in noise immunity for a given transmit power, when compared to many other wireless technologies. Spread spectrum technology also offers improved security, because the pseudo random nature of the codes used to produce the spread spectrum signal make the signal characteristics very similar to noise and, thus, the probability of accidental or deliberate reception by a third party is reduced.

Manufacturers of consumer goods have made efforts to reduce costs, for instance, by producing integrated circuits that can be used in a variety of applications. By producing integrated circuits that can be used in a variety of applications the number of integrated circuits of a given type, which are produced, can be increased. By increasing the number of integrated circuits of a given type, that are produced, the costs of design and production can be amortized over a larger number of units, and thus the cost per unit is reduced.

As a result, manufacturers of consumer goods have a need to minimize the number of different integrated circuits used in similar applications, and to manufacture integrated circuits that can be used in a variety of applications and yet provide good performance in all of them.

One of the difficulties of providing a circuit that can serve in many applications is that different applications can have different requirements. For example, in a cordless portable phone the data rate is, on average, equal in both directions. In portable phones, increased broadcast range is a desirable feature. Both the range of the phone and the bi-directional data rate may be important considerations. In wireless speaker applications, several channels of high fidelity sound must be carried a short distance, but only in one direction. In personal digital assistants, the desired data transmission rate can fluctuate. For example a high data rate is needed on the receive end when receiving e-mail and a high transmission rate is needed on the sending end when transmitting e-mail. In a portable computer there may be a need for a very low data rate and noise immune transmission capability, to transmit commands to an Internet service provider, and a need for a high data rate, to download web pages from the service provider. The receive data rate, transmit data rate, range, noise immunity, sensitivity, and security are all factors that influence each other in wireless applications and may change from application to application. In addition, even in a single application, the requirements may vary, depending on, for example, operating conditions or environment of use. For example, the clarity and fidelity of sound in a portable phone may be an important consideration but, as the signal starts to fade, a user may willingly accept a somewhat lower fidelity in order to have an increased range.

Many of the common wireless integrated circuits provide for a receive data rate, transmit data rate, range, noise immunity, and sensitivity, and security that are tailored to a particular application or operating condition. There is a need for integrated circuits with greater flexibility with different applications and adapt to changing conditions within applications.

Although the term CDMA is used widely to describe a type of telephone communication, the term spread spectrum may also be applied, and is used interchangeably herein. Spread spectrum, or CDMA is also applicable to many wireless communications systems and is not limited to use within portable phones.

The process of extracting data from a CDMA signal is commonly known by many terms such as correlating, decoding, and despreading. Throughout this disclosure these terms will be used interchangeably.

The codes used by a spread spectrum system are commonly referred to by a variety of terms including, but not limited to, PN (Pseudo Noise) codes, PR (Pseudo Random) codes, spreading codes, despreading codes, and orthogonal codes Throughout this disclosure these terms will be used interchangeably.

SUMMARY OF THE DISCLOSURE

Accordingly, preferred embodiments of the present invention are directed to systems which incorporate wireless spread spectrum technology. Cordless and portable telephones, and wireless data communication are examples of systems which may employ spread spectrum technology, and preferred embodiments within these systems are used to facilitate the disclosure.

Amplifiers within wireless communication systems typically have preset bandwidths. The amplifier bandwidth is chosen to amplify desired signals and to attenuate signals that fall outside of that band. Amplifiers, in general, are designed for bandwidth considerations. An amplifier designed to amplify a data signal with a data rate of, for example, 10 Megahertz may be able to amplify signal having a data rate of 10 Megahertz representing raw data of 10 Megahertz, or a signal having a 100 Kilohertz data rate multiplied by a 100 bit spreading code. In other words, once the data rate to the amplifier is set, the composition of the signal, whether it is pure data or data that has been multiplied by a spreading code, may be of little consequence to the amplifier.

Amplifiers within wireless spread spectrum systems have considerably wider bandwidth than amplifiers in similar applications which do not employ spread spectrum technology. This is because the spreading code multiplies the data rate of the communications signal by the length of the spreading code. This higher spread spectrum data rate, which is input to the amplifier, commonly called chipping rate, must be accommodated by amplifiers within the wireless system. Thus, such amplifiers must be able to accommodate the higher chipping rate.

There may be occasions where the spreading code size can be reduced or eliminated. If the spreading code can be reduced in length, or eliminated, then the relatively large bandwidth of such an amplifier, to support the spread spectrum coding, may instead be used for increased data rate transmission. Conversely, if the data rate is reduced, longer PN codes can be used to thereby increase the noise immunity and the transmission range of the signal.

In addition many wireless systems employ a half duplex communications scheme called TDD. TDD allows seemingly concurrent communications in both directions (transmit and receive) in such applications as portable phones, by rapidly switching between receiving and transmitting modes. In many TDD systems the transmit and receive portion of the TDD cycle each occupy approximately 50% of the communication time. A duty cycle of 50% may be chosen for convenience. In such applications as cordless phones a 50% transmit/receive duty cycle may be able to easily support the maximum data rate in each direction. However by increasing the transmit portion of the duty cycle, more data can be transmitted. Conversely by increasing the duty cycle of the receive portion of the duty cycle, more data can be received.

These techniques, alone and in combination, can be used to increase the flexibility of circuits within wireless communication systems. Circuitry that can accommodate these techniques can be used in a wider variety of wireless systems than those which must be individually tailored to the particular wireless system in which they are embedded. These techniques alone and in combination can also add flexibility within a single application, for example increasing data throughput or range as application conditions demand.

DETAILED DESCRIPTION OF PREFERRED EMBODIMENTS

Spread spectrum, also known as CDMA, is a method of signal modulation which distributes the data contained in a signal over a wide bandwidth. This is accomplished by replacing individual data bits in a data stream with spread spectrum PN codes. Since each data bit is replaced by a number of spread spectrum bits, called chips, the number of bits within the data stream is multiplied by the PN code length. The bit rate of the spread signal data, after each data bit has been replaced by a PN code, is often called the "chipping rate". The chipping rate is equal to the data rate of the original data signal, before spreading, multiplied by the PN code size. The chipping rate is greater than the original signal's data rate because each data bit is replaced by the PN code which may be many bits long. Consequently the band pass of the signal broadcast amplifiers must be greater than the band pass that would be needed to amplify the unspread signal, in order to accommodate the higher frequency chipping rate. A wider bandwidth must be used to accommodate the higher frequency signal.

Traditionally, in the art a communication scheme is evaluated based on how little bandwidth it needed to carry a given amount of information. Spread spectrum communication has the advantage that more than one spread spectrum transmitter may broadcast in the same frequency spectrum without blocking the demodulation of other concurrent spread spectrum transmissions which are using different. PN spreading codes. Spread spectrum systems employ different Pseudo-random Noise (PN) codes for each transmitter and, by using these different PN codes, spread spectrum signals are discriminated from all the other spread spectrum transmissions that may be occurring simultaneously.

In addition spread spectrum communication has an added advantage that it can employ a very redundant, noise immune signal that may be reliably received and decoded with substantially less power than non spread spectrum signals. For a given power output, spread spectrum signals may have a much greater range than non spread spectrum signals. Additionally, the characteristics of range and noise immunity are dependent on the size of the code. As a general rule the longer the code, the more redundancy that is contained in the code and the greater the range that may be achieved for a given amount of power. The length of code varies from application to application. For example in some portable phones, the length of the PN code is 16 bits (often referred to as chips), whereas in the global positioning system (GPS), the length of the PN code is 1,023 chips.

Figure 1:
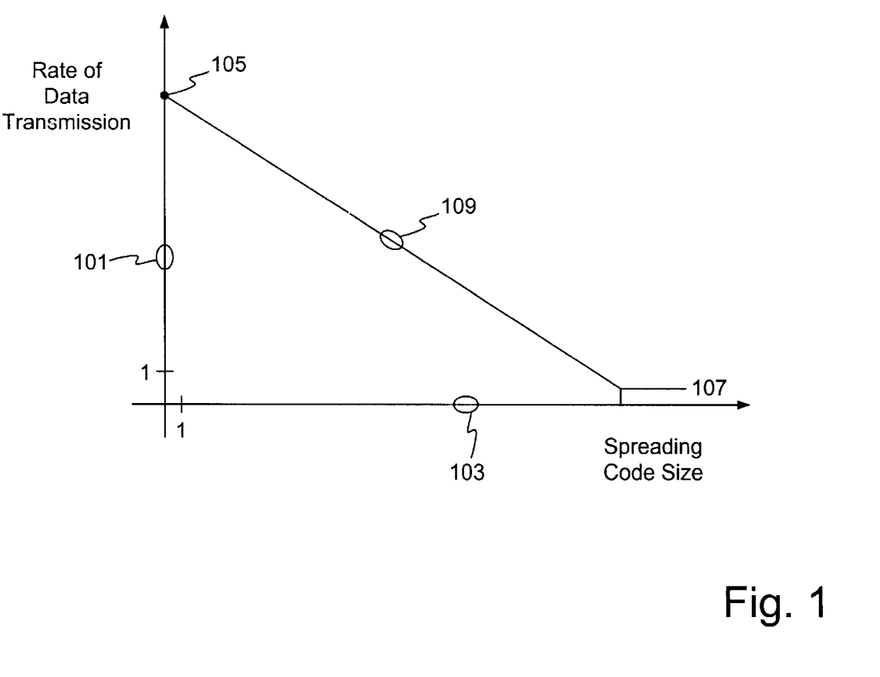
FIG. 1 is a graph illustrating a relationship between amount of data transmitted and the spreading code size.

FIG. 1 is a graph of a curve 109 illustrating a relationship between the rate of data transmitted and the spreading code size for a given transmission (chipping) rate. The maximum data is transmitted when there is no spreading code, or equivalently when the spreading code is "1". A spreading code of "1" will replace every "1" bit by a spreading code of "1" and will replace every "0" bit by an inverse spreading code of "0". This maximum data point 105 is shown on the Vertical (rate of data transmitted) axis 101. The minimum data rate 107 is shown on the Horizontal (spreading code size) axis 103. The minimum data rate is achieved when the spreading code is so long that only one bit of data may be transmitted per time period. The smaller the PN code, the more data that can be transmitted as shown in FIG. 1, conversely the larger the PN code the more redundancy in the signal and the greater the range and noise immunity of the signal for a given amount of transmit power.

Figure 2:
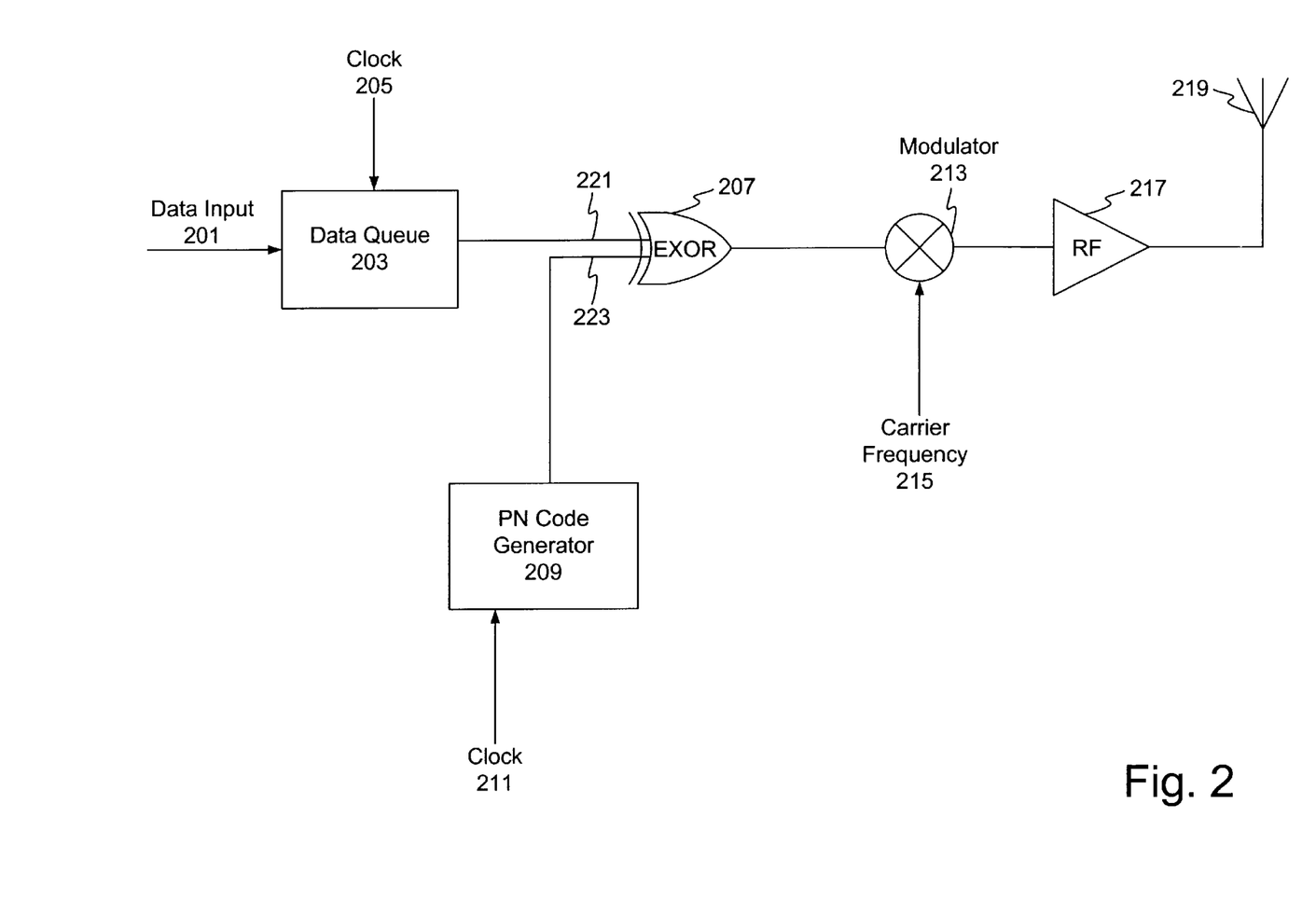
FIG. 2 is a block diagram illustrating a spread spectrum transmitter.

FIG. 2 is a block diagram illustrating a spread spectrum transmitter. Digital data is provided to the system via a data input 201. The data is then stored in a data queue 203 until it is ready to be transmitted. When the next bit of data is ready to be transmitted, it is clocked out of the data queue via clock line 205 and coupled to the input 221 of the Exor (Exclusive Or) gate 207. The PN Code generator 209 is then clocked via clock signal 211 and the output of the PN code generator 209 is coupled to the input 223 of the Exor (Exclusive Or) gate 207. The PN code generator is clocked in a fashion such that each bit of the PN code is exclusive Exor'ed with each bit of the data code. If N is the size of the spreading code used, then clock 211 that clocks the PN code will run at a frequency that is N times faster that the clock 205 which clocks the data. The output of the Exor (Exclusive Or) gate 207 is coupled to the modulator 213, for modulating the carrier frequency 215. The output of the modulator is coupled to a RF power amplifier 217 and the antenna 219 for broadcasting the signal. The data rate into the RF power amplifier is N times greater than the rate of data input into the circuit, where N is the length of the PN code. Therefore the RF power amplifier must have a higher bandwidth to transmit the higher data rate spread signal than it would to transmit the same signal without the spreading, that is in cases where N is greater than 1.

Figure 3:
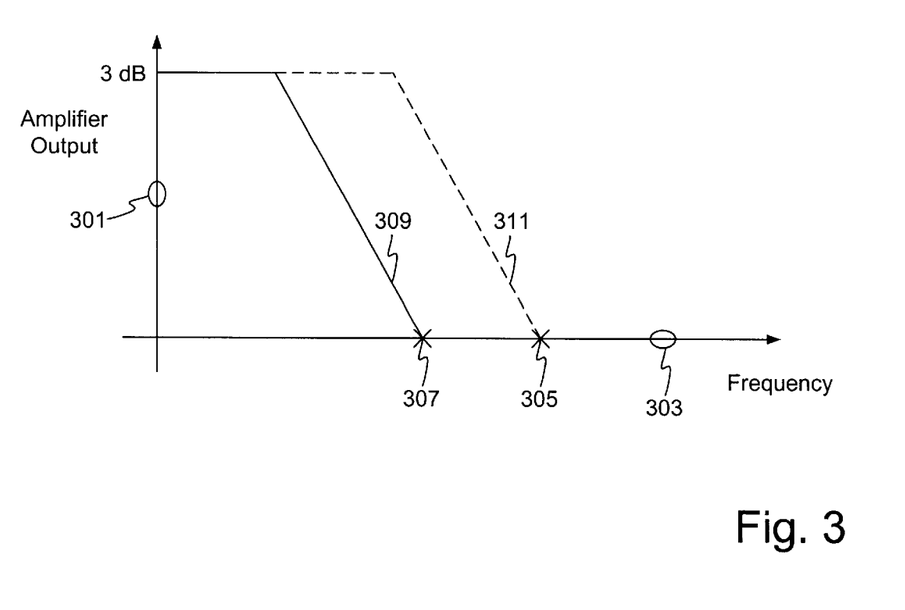
FIG. 3 is a graph illustrating a higher band pass for a spread spectrum transmitter.

FIG. 3 is a graph illustrating a higher band pass for an amplifier of a spread signal, relative to an amplifier of the same signal without spreading. The amplifier output is shown on the Vertical axis 301 and the frequency of the amplifier is shown on the Horizontal axis 303. Curve 309 represents an amplifier without spreading. The 3 dB point of the amplifier, traditionally considered to mark the bandwidth of the amplifier, is shown at point 307. In contrast, to be able to amplify the same signal after spreading, the amplifier has a curve as shown 311, with a 3 dB point at 305. In other words the bandwidth of the amplifier with the spreading is increased to broadcast the same amount of data using a spread signal.

Figure 4:
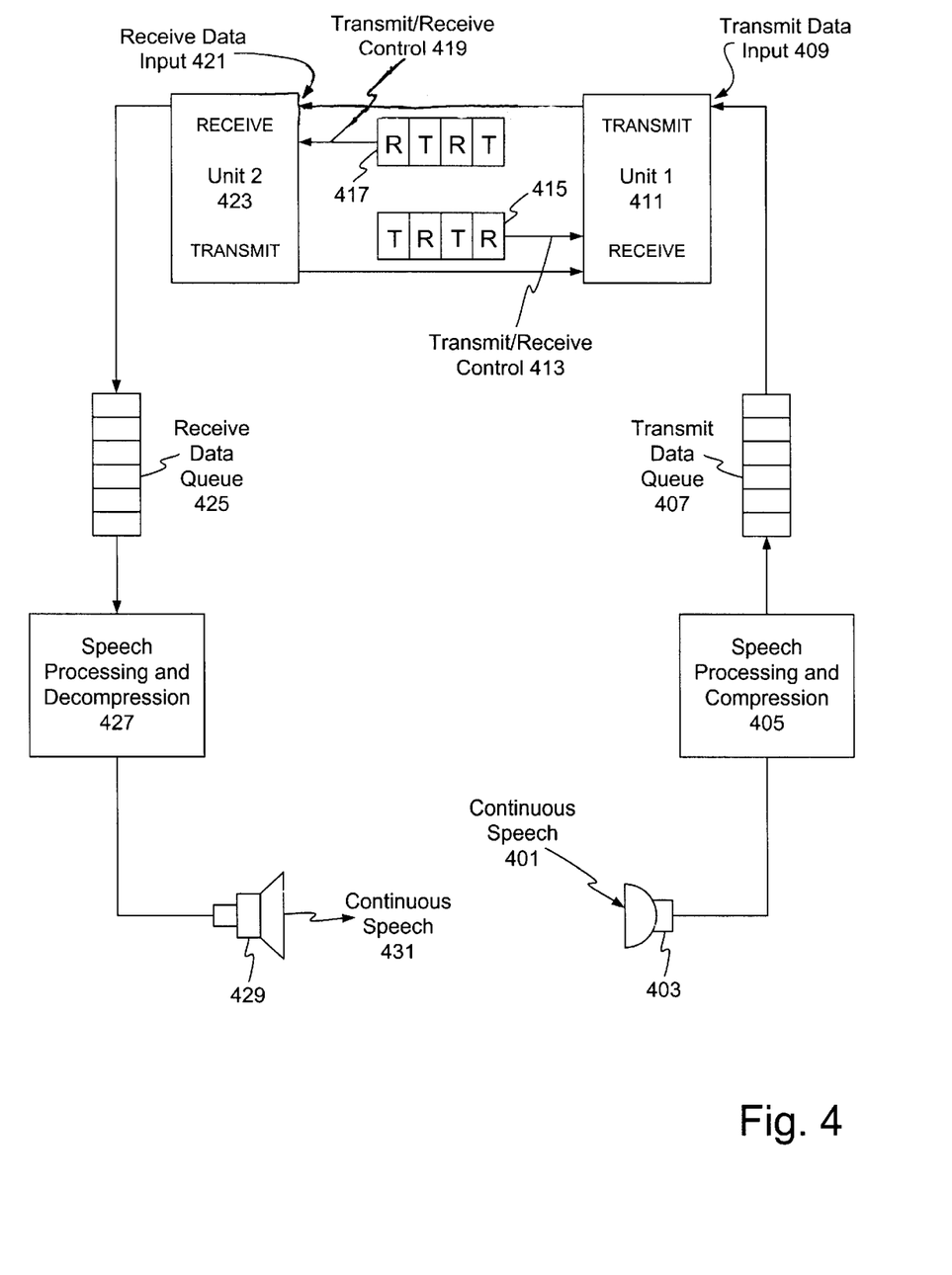
FIG. 4 is a block diagram showing a transmission and reception of continuous speech using Time Division Duplex (TDD)

FIG. 4. is a block diagram, of a representative example of a portable telephone, showing the transmission and reception of continuous speech using a Time Division Duplex (TDD) protocol. Continuous speech 401 is provided to the system via a microphone 403. Those skilled in the art will realize that instead of a continuous speech input and a continuous speech output, any manner of data could be substituted and the method described would be equally viable.

The Microphone 403 is coupled to a speech processing and compression block 405 where the continuous speech is digitized and compressed. The resulting data is provided to the transmit data queue 407, where it is maintained prior to transmission. Unit 1, 411, is a transmit and receive unit, for example the base unit of a portable phone. The transmitting and receiving times of Unit 1, 411 are represented by the time slices 415, which are marked R, for receive, and T for transmit. Unit 2, 423 is a transmit and receive unit, for example the mobile hand unit of a portable phone. The transmit times 415 of Unit 1, 411 are timed to coincide with the receive times 417 of Unit 2, 423, so that the units may operate in half duplex mode, in this case Time Division Duplex—TDD. When Unit 1, 411 is transmitting, Unit 2, 423 cannot transmit. When Unit 2, 423 is transmitting, Unit 1, 411 cannot transmit. In this way the two units do not transmit at the same time. Transmit data 407 is provided to Unit 1, 411. When the time slice "T" to transmit 415, arrives, Unit 1, 411 transmits the data to Unit 2. The transmitted data is provided to Unit 2, 423 in the receive data input 421. The received data is then provided to a receive data Queue 425, where it is held until the speech processing and decompression module 427 is ready to receive it. When the speech processing and decompression module 427 is ready to receive, the data is provided from the receive data queue 425 to the speech processing and decompression module 427 for processing and decompression. The decompressed, processed speech is then provided to an output device, such as the speaker 429, for reproducing it as continuous speech 431. The data rate between units is high enough so that, even though the transmission occurs in time slices (415), the listener hears only continuous speech at the reception end and is unaware of the interrupted nature of the transmission. A 50% duty cycle car be more than adequate to transmit continuous speech. Typically, even when continuous speech is transmitted, a portion of the transmit duty cycle remains unused.

Figure 5:
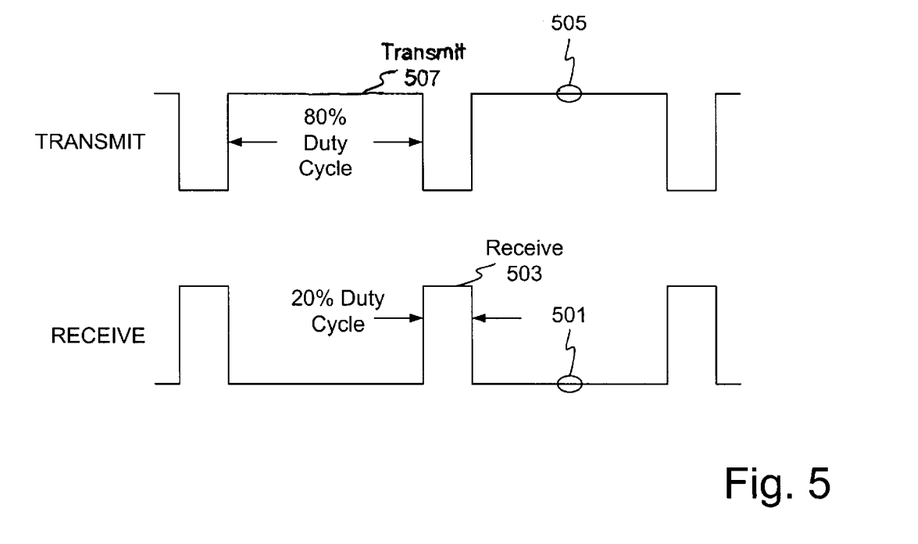
FIG. 5 is a graphical illustration of a variable transmit duty cycle for a TDD device.

FIG. 5 is an example illustration of a variable transmit duty cycle for a TDD device. In some portable phones a duty cycle of 50% is maintained so that the handset can transmit half of the time to the base unit and the base unit can transmit half of the time to the handset. This may be done because a duty cycle of 50% is typically more than adequate to transmit voice in both directions and so there is no need to change the duty cycle. However if the data in one direction were greater than in the other direction, the duty cycle could be adjusted to support the greater data requirements. For example, if a base unit were to broadcast a high fidelity music signal to the hand unit, such as when a person was placed on hold, the data requirement for transmission might be increased from the base station to the hand unit. By adjusting the duty cycle of the transmit and receive signals this type of application might be accommodated. A situation where the transmit duty cycle has been increased to transmit more data is illustrated in FIG. 5. The transmit 505, waveform in FIG. 5, has increased to a 80% duty cycle 507 and the receive waveform 501 has decreased to a 20% duty cycle 503, with respect to the above described 50% duty cycle scheme. It should be noted that there can also be an idle time when a unit is neither receiving or transmitting. In such a case the 100% duty cycle would be composed of a transmit duty cycle, plus a receive duty cycle, plus an idle duty cycle.

Figure 6:
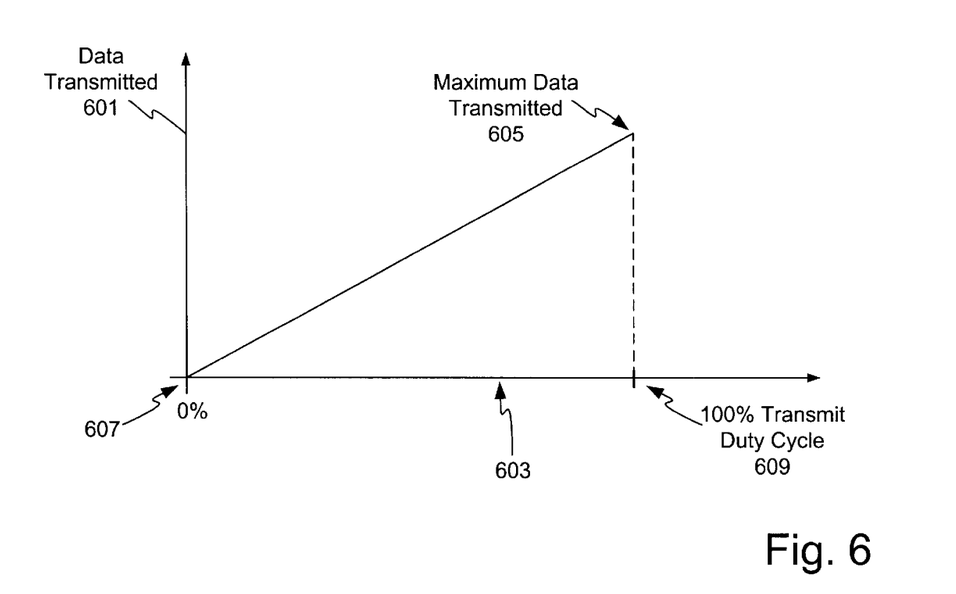
FIG. 6 is a graph showing an effect of duty cycle on the amount of data which may be transmitted.

FIG. 6 is a graph showing an effect of duty cycle on the amount of data which may be transmitted. The amount of data that can be transmitted is shown on Vertical the axis, 601 of the graph. The duty cycle of the transmit waveform is shown on the Horizontal axis 603. If the transmit duty cycle is 0%, then no data can be transmitted, this is shown as point 607. If the transmit duty cycle is 100%, point 609, i.e. always transmitting, then a maximum amount of data, as represented by the point 605, can be transmitted.

Figure 7:
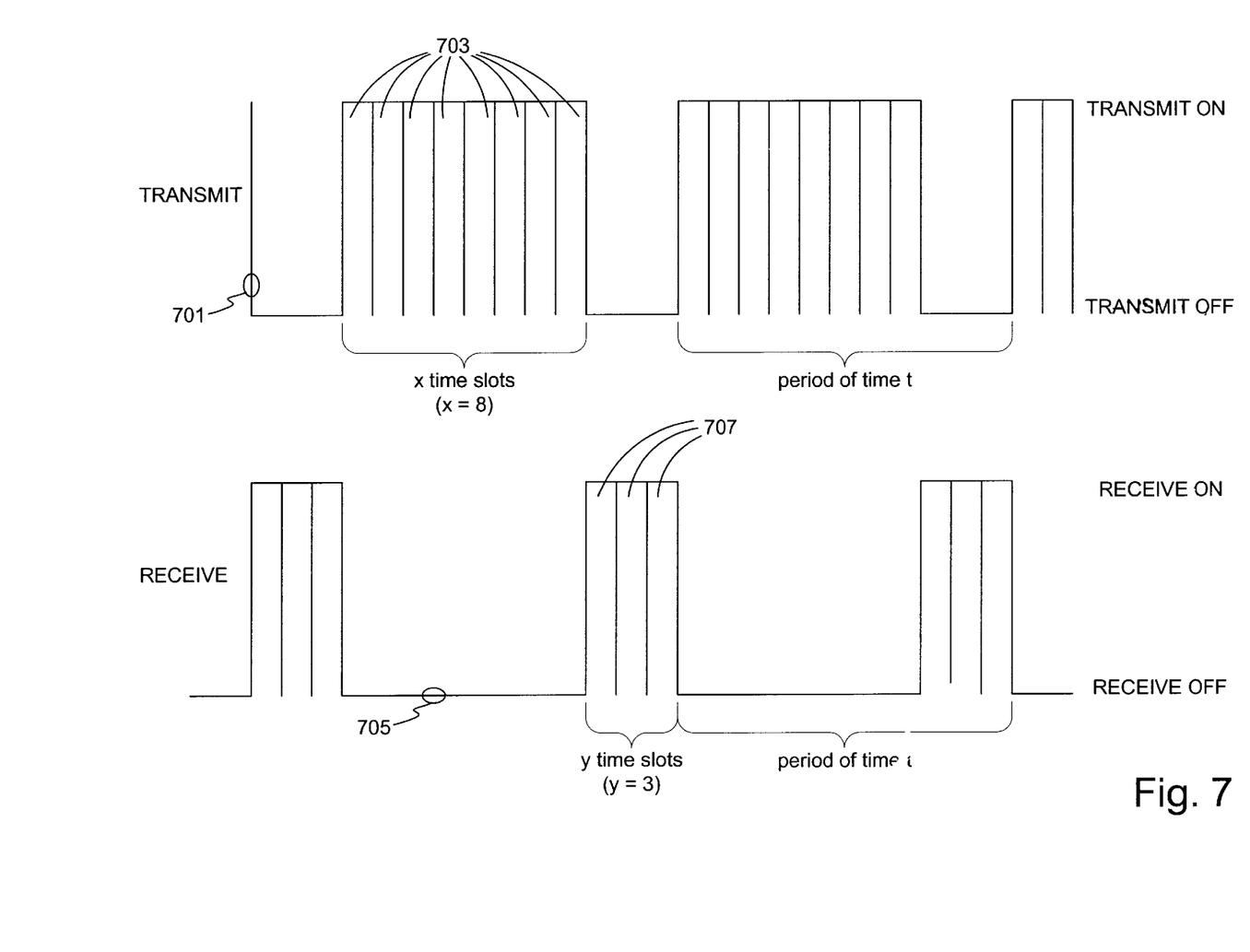
FIG. 7 is a graphical illustration of transmit duty cycle control using time slicing.

FIG. 7 is a graphic illustration of a transmit duty cycle control arrangement using time slicing. In this example, instead of adjusting the duty cycle, the transmit and receive data cycles are each allotted a number of discrete time slices. If the transmit data requirement increases, as in the example above where "on hold" music was continually transmitted to handsets, then the transmit waveform 701 might be allotted more time slices 703 than the number of timeslices 707 allotted to the receive, 705, waveform.

Figure 8:
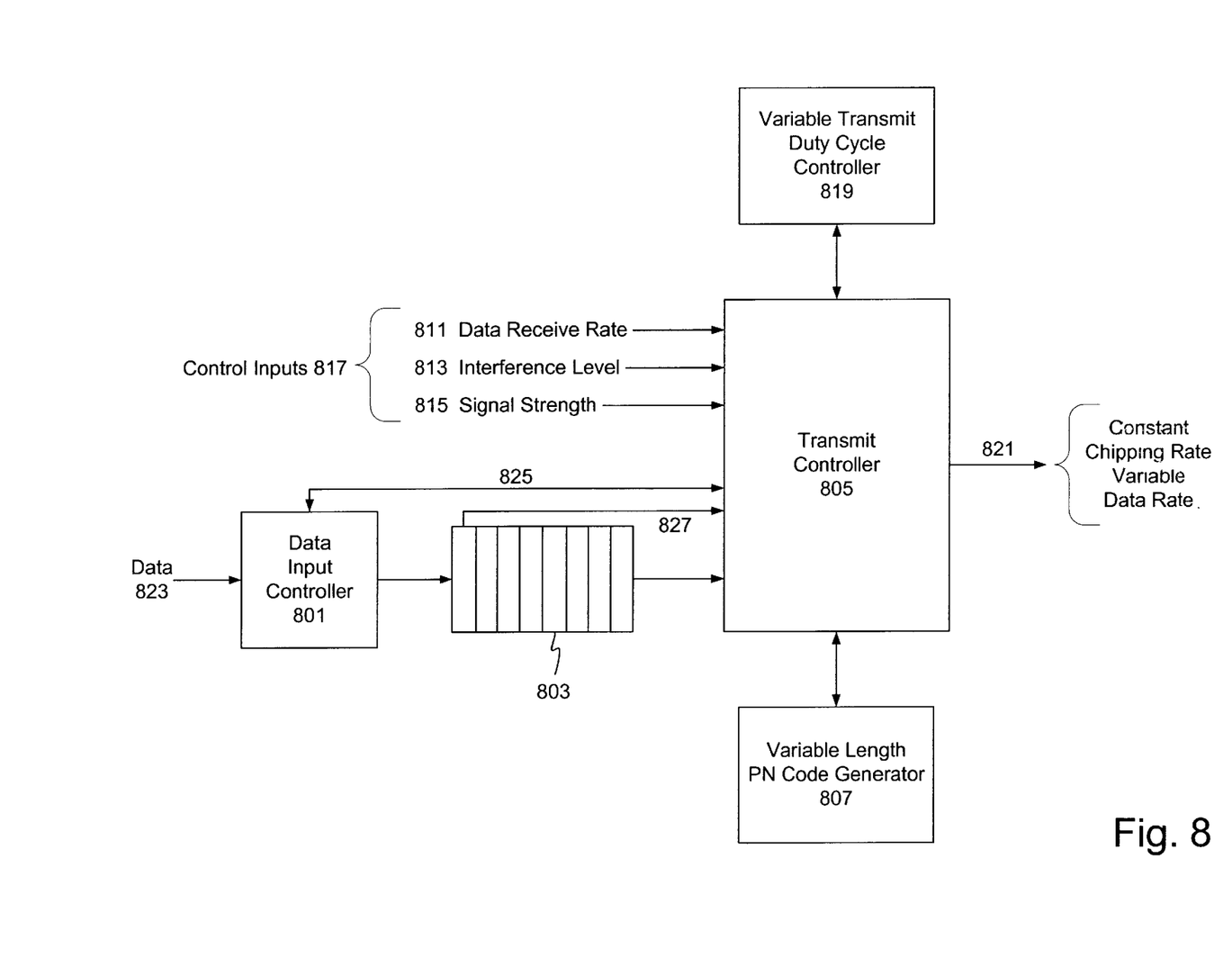
FIG. 8 is a block diagram showing a preferred embodiment of the invention.

FIG. 8 is a block diagram showing a preferred embodiment of the invention. In this embodiment a transmit controller 805 is present and produces output 821. The transmit controller is a mechanism for adjusting the signal being transmitted depending on various criteria.

For example, if the transmit controller determines that the PN code being used to spread the signal is longer than it needs to be to transmit an acceptable signal to a receiver, it can shorten the length of the PN code. A shortened PN code will mean that the transmitter can transmit more data without increasing the bandpass of the amplifiers used to amplify the signal being transmitted.

The transmit controller can also increase the data transmission rate, if it is used within a half duplex system, by increasing the duty cycle of the transmission portion of the cycle. In a half duplex system, the system is transmitting part of the time and receiving part of the time, and part of the time it may be idle (neither transmitting nor receiving). If the transmit controller needs to increase the amount of data being transmitted, it can increase the portion of time allotted to the transmit function by using the idle time to transmit. It may also increase the time allotted to the transmit function by decreasing the amount of time allotted to the receive function and using that time to transmit.

In a Time Division Duplex system the transmit controller can increase the data rate by increasing the number of discrete time slices that are allocated to the transmit function. For example for a period of time T and a time slot t, where Nt=T, and N is an integer greater than 1, the transmit controller may allocate a number, X (X=8 in FIG. 7), of time slots t within the period T for transmitting, and a number, Y (Y=3 in FIG. 7), within the period T for receiving, where X+Y=N (N=11 in FIG. 7).

The transmit controller can conversely decrease the data rate transmitted in order to achieve other desired results. For example the, transmit controller might decrease the data rate in order to increase the length of the PN code. There are many reasons that the PN code length might be increased, such as to increase the transmit range or to overcome interference or jamming.

The transmit controller can also, for example, decrease the data rate by decreasing the input sampling rate, in systems such as portable phones where an input signal is sampled for the purpose of transmitting. A decrease in the input sampling rate may decrease the fidelity of the input signal. In certain instances the trade off may be desirable, such as when using the extra signal bandwidth to increase the length of the spreading code and thereby increase the range of the signal.

The controller may also limit the data rate of the incoming signal by using coding techniques and reducing the number of bits used to represent the signal.

The transmit controller can adjust several interdependent variables including, but not limited to: input signal sampling rate, spreading code size, transmit duty cycle, receive duty cycle, data rate, amount of data transmitted, time slices allotted to the transmit cycle, and computing resources to encode the signal, in order to meet a specific requirement.

The transmit controller can also be used to adapt during operation (or on the fly), to changing conditions in embodiments, such as a portable phone, which are subject to a changing environment.

The transmit controller is coupled to a variable transmit duty cycle controller 819. The transmit duty cycle controller 819, under the control of the transmit controller 805, controls the duty cycle of the transmit and receive functions, or alternately controls the number of time slots allotted to the transmit and receive functions. The transmit controller 805, also interfaces with a variable length PN code controller 807. This block, under the control of the transmit controller 805, can supply PN codes of varying lengths to the transmit controller, to be used for spreading the data signal. The data input controller 801, under control of the transmit controller, takes the data 823, that is coupled to the data input controller's input, and performs various operations on it, and then couples the processed data into a data transmit queue, 803. The type of operations that the data input controller can perform are dependent on the data which is input. If for instance the data is an analog voice waveform, as in the case of a portable phone, the data input controller may perform an analog to digital conversion function. It may also sample the input signal at a given rate. The sampling rate of the data input controller 805 might also be adjusted dependent on the amount of data to be transmitted. For example in a portable phone, if the chipping rate of the transmit signal were adequate to support a sampling rate which would yield a 20 Hz to 20 kHz audio bandwidth, then the transmit controller 805 might instruct the data input controller to sample at a rate of X samples per second that would yield a 20 Hz to 20 kHz audio bandwidth. However, if the telephone were having difficulty supporting a full 20 kHz audio rate, perhaps because a long spreading code was needed to support long distance operation, the transmit controller, 805, might instruct the data input controller to sample at a rate of 0.5X samples per second which would yield a 20 Hz to 10 kHz audio bandwidth. The sound fidelity would be reduced but the reduced data rate would allow a longer PN code to be used, thus increasing the distance at which a signal transmitted from the unit could be received.

The data transmit queue, 803, is a repository for data, 823, prior to transmission. It acts as a buffer for transmit controller 805. The length of this queue, 827, is also indicative of whether the transmit controller 805 can support the incoming data rate. If the queue, 805, maintains an average size, then the transmit controller 805 can support that data rate. If the input queue 803 size increases then the transmit controller is able to determine that the data rate must be increased to support the present input data rate, or the queue will eventually exceed the memory available to support it and the system may crash. The transmit controller may use other inputs in addition to the size of the queue 803 in order to adjust the Data Input Controller 801. The transmit controller may also look at control inputs 817, which may contain such information as data receive rate 811, signal interference level 813 by and signal strength 805. In addition the transmit controller, 805 may adjust not only the Data Input Controller 801, but the Variable length PN code generator, and the Variable Transmit duty cycle controller in order to tailor the output data stream to a specific application, or specific conditions.

Figure 9:
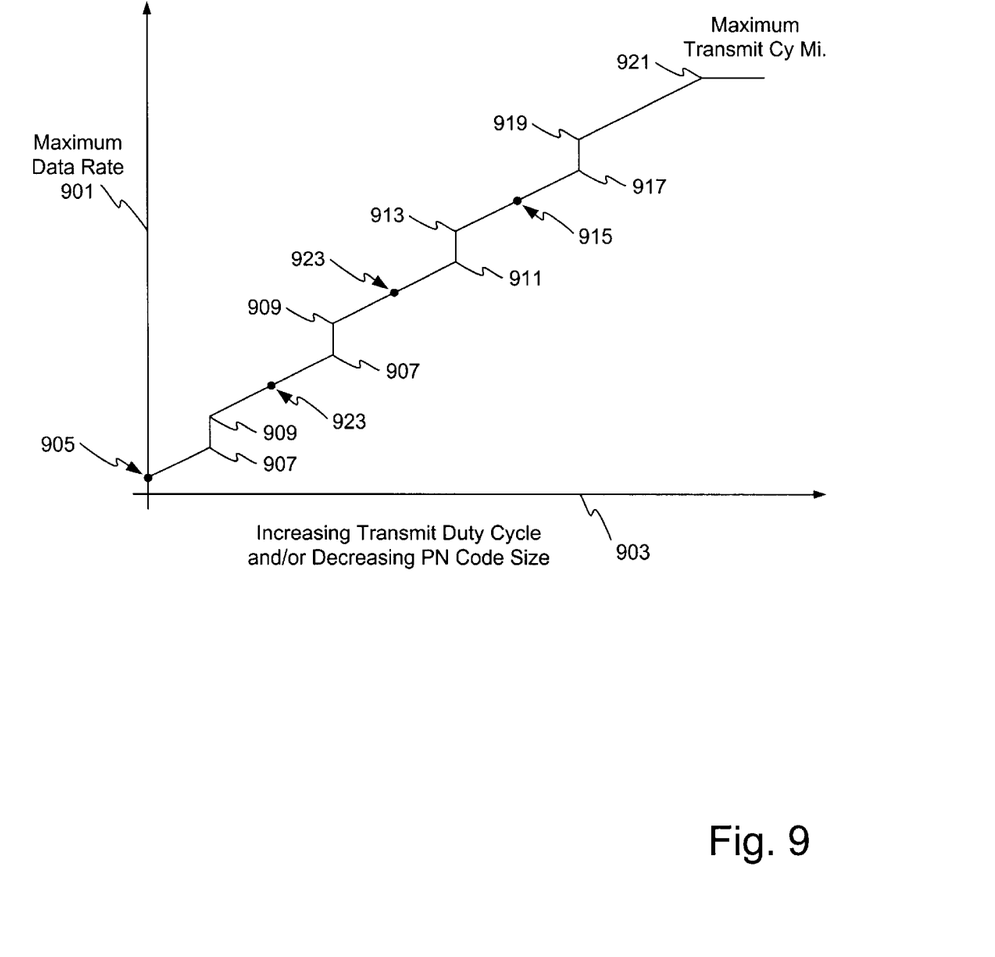
FIG. 9 is a graph illustrating how an embodiment of the invention which utilizes both variable duty cycle and variable PN code size may be used to control transmit data rate of the device.

FIG. 9 is a graph illustrating an example of how preferred portable telephone embodiments of the disclosure, which utilizes both variable duty cycle and variable PN code size, may control the transmit data rate of the device. The maximum data rate that may be supported by the device is displayed on the Vertical axis 901 of the graph. The Horizontal axis represents an increasing transmit duty cycle and/or a decreasing PN code size. Both an increasing transmit duty cycle and/or a decreasing PN code size may be used to increase the amount of data that can be transmitted. For example, a default point, 923, may represent a 50% transmit and a 50% receive duty cycle and a spreading code of 12 bits. As the curve transitions from point 923 to 911, the transmit duty cycle increases from 50% to 90% and the maximum data which may be transmitted increases. At point 911, the system is at 90% duty cycle and has achieved the maximum data transmission which may be transmitted given a PN code size of 12 bits. The curve in the graph then jumps from point 911 to point 913 as the system switches to a shorter spreading code, for example 8 bits. At point 913, because there is a greatly increased transmission capacity due to the switching to a smaller spreading code, the system switches back to a 10% transmit duty cycle. The system may then increase the duty cycle from point 913, where the transmit duty cycle is 10% to point 917 where the transmit duty cycle is 90%. The curve illustrates various operating points which may be used to serve different data capacity requirements. Those skilled in the art will recognize that a variety of algorithms and a variety of protocols may be employed in various embodiments of the invention in order to accommodate a variable data rate, and that the curve depicted in FIG. 9 is merely an illustration of one such embodiment.

The first preferred embodiment comprises a portable telephone such as illustrated using FIG. 9. The portable telephone unit connects to a base station via a signal broadcast from the portable phone. At the point in time that the telephone unit connects to the base station, the portable telephone unit is operating at default values for transmit duty cycle and for spreading code size. This point is represented at point 923 on the graph of FIG. 9. At point 923, the telephone handset is operating at a 50% transmit and 50% receive duty cycle, the PN code is 12 bits long. At this user then plugs the handset into their computer to transmit data. As the data begins to use more and more of the allotted transmit duty cycle, the transmit controller 805 begins to increase the duty cycle, and the maximum transmit data rate increases. The maximum data rate is increasing because the total amount of time that the unit can transmit is increasing. This is represented by a move along the curve in FIG. 9 in the positive Vertical and positive Horizontal directions.

At the point represented by 911 on the graph, the transmit duty cycle has reached a maximum limit. In the FIG. 9 embodiment, the limit is set at 90% because it is still desirable to retain some receive capacity in this particular embodiment. If more transmit capacity is desired, the portable telephone unit can query the base unit. In the present the signal being received, by the base unit, is very strong. The portable telephone unit can then signal the base unit that it will switch to an 8 bit spreading code. When this happens, the portable telephone unit will be operating as represented by point 913 on the curve. At point 913, the spreading code is 8 bits, the transmit duty cycle has been set back to 10%. If the computer is not at its data transmit limit, it may begin to feed data to the portable telephone unit at a faster rate. The portable telephone unit may again respond by allotting more transmit time to the system. At point 915, the duty cycle has reached a 50% transmit and 50% receive duty cycle. The computer can transmit more data, so the transmit controller increases the duty cycle until it reaches point 917 on the graph of FIG. 9, 90% transmit duty cycle. At that point, more data capacity can still be used by the computer which is transmitting data to the handset. The system then queries the base unit and finds out that the signal being received is very strong. The portable telephone unit then signals the base unit that it will switch off the spreading code, or equivalently uses a spreading code of "1". When the hand unit switches off the spreading code the system cuts back the transmit duty cycle to 10% which is shown as point 919. If the computer is not at it's maximum data rate the handset can increase the duty cycle of the transmit portion of the cycle to 90%, which is shown in the graph of FIG. 9 as point 921. At point 921, the handset has switched off the spreading code, or equivalently uses a spreading code of "1", is transmitting raw data, and has reached the limit of 90% transmit duty cycle. At point 921, the portable telephone unit has reached it's capacity to transmit data, and it's maximum data rate has been achieved.

If, at the nominal operating point, 911 on FIG. 9, the handset was capable of transmitting 10 kilobytes per second, the chipping rate at that point was 120 kilobytes per second (data rate of 10 kilobytes/sec. times a 12 bit spreading code). This means that, by switching off the spreading code, a 12 times data rate or 120 kilobytes per second can be achieved. In addition, the duty cycle can be increased from 50% to 90%, which is an 80% increase. Therefore, the maximum data rate that is achieved is 12 times 1.8 or 21.6 times the nominal data rate that could be achieved if the spreading code were fixed at 12 bits and the transmit duty cycle were fixed at 50%.

A second preferred embodiment of the invention also involves a portable phone handset. In the second portable telephone embodiment, the portable phone again connects to the base station. At the point that the telephone connects to the base station, the portable phone is operating at default values for transmit duty cycle and for spreading code size. This point is represented by point 923 on the graph of FIG. 9. At point 911, the telephone handset is operating at 50% transmit 50% receive duty cycle, the PN code is 12 bits long. In this example, the phone is at the end of its range and the system needs to adjust for increased range to broadcast to the base unit. The transmit controller 805 can adjust the parameters of the portable phone system in several ways. The first way being that, if the system is using less than its 50% duty cycle, the system controller can switch to a longer PN code, if it can be supported, or the controller can increase the broadcast duty cycle to the point where it can switch to a longer PN code. The longer code will increase the range. As the distance to the base unit continues to increase, there will be a point where the longest PN code that is allowed by the system is being used and the duty cycle of the broadcast cannot be increased further. At that point, the transmit controller 805 can command the data input controller to sample the voice signal less frequently, which will produce less data. The sampling rate can be decreased to the a point where a longer PN code can be used thereby extending the range of the phone still further. The fidelity of the audio signal will decrease as the sampling rate of the input signal decreases. But, some degradation in signal in this embodiment may be a desired feature, because it will cause the communication quality to degrade gradually as longer PN codes are used. The degradation of the quality of the signal will most likely be taken by the user as signaling the onset of an out-of-range condition, while extending the range of the handset as far as possible. If the sampling rate of the audio signal must be reduced to the point where the speech signal is no longer intelligible, then the system has reached it's limit.

Figure 10:
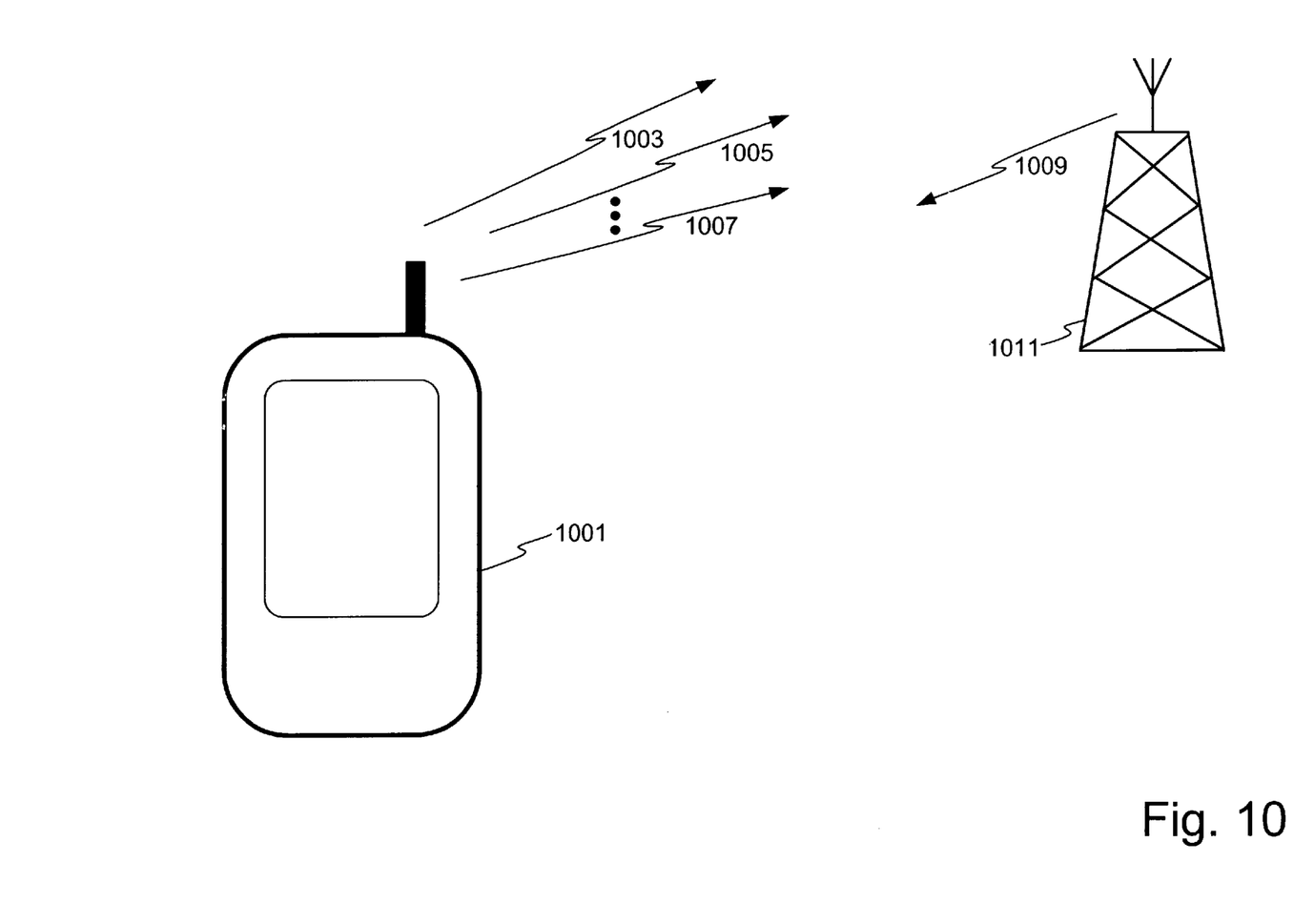
FIG. 10 is a graphical illustration of an embodiment of the invention as implemented within a Programmable Digital Assistant (PDA).

A further embodiment of the invention comprises a PDA or programmable digital assistant as shown in FIG. 10. The present embodiment the PDA is primarily used to send and receive e-mail messages. The PDA 1001 would establish communications with a base unit 1011 using a default PN code size. It would then send a series of transmissions 1003, 1005, and 1007, which incorporate different length PN codes to the base unit 1011. The base unit would then reply with a message 1009, containing information on how well the various messages were decoded, and selecting a minimum size PN code (to maximize transmission data throughput). The PDA would then set its PN code to the minimum size, set its transmit duty cycle to maximum and then transmit all it's e-mail messages to the base unit. The process could then be reversed. The PDA 1001 could then instruct the base unit 1011 as to which PN code was the minimum size needed to accurately receive the messages. The base unit then could use the minimum size code in order to maximize data throughput. In this manner, the PDA and a base unit could exchange e-mail at the highest data rate possible in order to minimize the connect time between the two units.

Another embodiment of the system comprises a set of wireless speakers. In the case of wireless speakers, there would be transmission in only one direction so the transmit (from the base unit) duty cycle would be maximized. Also, the maximum frequency that would be delivered to the speaker would be known. The maximum spreading code size could then be chosen that was consistent with the data rate to be delivered to the speaker. This code might change size depending whether the speaker system was monophonic, stereo, or a surround sound system.

Another embodiment of the system comprises a locator beacon of the type that is used, for example, to track vehicles. In this embodiment the data rate would be known and would consist of a vehicle ID, serial number, etc. The vehicle identity information would be broadcast from a vehicle. It would only be used in the broadcast mode, so the broadcast duty cycle could be set to maximum time. Knowing these parameters, a maximum size of PN code could be used. This maximum size PN code could yield the maximum range, maximum interference tolerance etc. In this application the data is limited and the range of broadcast might be the variable to be maximized by the adjustment of the system.

Those skilled in the art will appreciate the flexibility demonstrated in the foregoing disclosures. Those skilled in the art will also recognize that the approach can be used to accommodate both static and dynamic characteristics of various systems. Those skilled in the art will also recognize the invention is embodied in the appended claims and not limited to the few embodiments chosen for illustrative purposes, and that the embodiments discussed merely serve to illustrate the invention and in no way limit it.

We claim:

1. A method for adjusting the data rate transmitted in a spread spectrum communications system, in which a transmit signal is formed by multiplying a data signal by a spreading code, the method comprising:

adjusting the data rate of the data signal, and adjusting the spreading code length in an inverse relationship to the data rate of the data signal to maintain a generally constant chipping rate of the transmit signal, wherein the data rate of the data signal is adjusted by adjusting the sampling rate of an input signal.

2. A method for adjusting the data rate transmitted in a spread spectrum communications system, in which a transmit signal is formed by multiplying a data signal by a spreading code, the method comprising:

adjusting the data rate of the data signal, and adjusting the spreading code length in an inverse relationship to the data rate of the data signal to maintain a generally constant chipping rate of the transmit signal, wherein adjusting the data rate of the data signal comprises increasing the data rate of the data signal to a maximum data rate; and wherein adjusting the spreading code length comprises setting the spreading code to "1", thereby maintaining an effectively constant chipping rate and eliminating the effect of the spreading code.

3. A method for adjusting the data rate transmitted in a spread spectrum communications system, in which a transmit signal is formed by multiplying a data signal by a spreading code, the method comprising:

adjusting the data rate of the data signal, and adjusting the spreading code length in an inverse relationship to the data rate of the data signal to maintain a generally constant chipping rate of the transmit signal, wherein adjusting the data rate comprises receiving the data to be transmitted into a data transmit queue; and adjusting the data rate of the data signal based on the rate of the change of the length of the data transmit queue.

4. A method for adjusting the amount of data transmitted in a Time Division Duplex communication system having a duty cycle for transmitting data and a duty cycle for receiving data, the method comprising the steps of:

adjusting the transmit duty cycle, and adjusting the amount of data transmitted in proportion to the changed transmit duty cycle.

5. The method of claim 4, wherein the step of adjusting the transmit duty cycle comprises:

adjusting the transmit duty cycle to the maximum transmit duty cycle; and adjusting the receive duty cycle to the minimum receive duty cycle.

6. The method of claim 4, wherein the step of adjusting the transmit duty cycle comprises:

receiving data to be transmitted by the Time Division Duplex communication system into a data transmit queue; and adjusting the transmit duty cycle based on the length of the data transmit queue.

7. The method of claim 4, wherein the step of adjusting the transmit duty cycle comprises:

receiving data to be transmitted by the Time Division Duplex communication system into a data transmit queue; and adjusting the transmit duty cycle based on the rate of change of the length of the data transmit queue.

8. A method for adjusting the data rate transmitted in a Time Division Duplex spread spectrum communications system, in which a transmit signal is formed by multiplying a data signal by a spreading code, the method comprising:

adjusting the transmit duty cycle to create an adjusted transmit duty cycle, and adjusting the spreading code length in relationship to the adjusted transmit duty cycle whereby an essentially constant chipping rate of the transmit signal is maintained.

9. The method of claim 8 wherein the step of adjusting the spreading code length in relationship to the adjusted transmit duty cycle comprises:

receiving the transmit signal with a communications receiver; and adjusting the spreading code length based upon the signal strength of the transmit signal received by the communications receiver, whereby an essentially constant chipping rate of the transmit signal is maintained.

10. The method of claim 8 wherein the step of adjusting the spreading code length in relationship to the adjusted transmit duty cycle further comprises:

receiving the transmit signal with a communications receiver; and adjusting the spreading code length based upon the signal to noise ratio in a communications receiver, which is receiving the transmit signal, whereby an essentially constant chipping rate of the transmit signal is maintained.

11. An apparatus for producing a variable data rate transmit signal within a spread spectrum communication system, in which a transmit signal is formed by multiplying a data signal by a PN code, the apparatus comprising:

a PN code generator for generating PN codes of different lengths;

a PN code generator control input for accepting a PN code generator control signal, whereby the length of the spreading code is adjusted; and a transmit controller whereby a PN code generator control is generated, wherein the spreading code generator generates a spreading code of "1," thereby eliminating the effect of the spreading code generator.

12. An apparatus for producing a variable data rate transmit signal within a spread spectrum communication system, in which a transmit signal is formed by multiplying a data signal by a PN code, the apparatus comprising:

a PN code generator for generating PN codes of different lengths;

a PN code generator control input for accepting a PN code generator control signal, whereby the length of the spreading code is adjusted;

a transmit controller whereby a PN code generator control is generated;

a data input controller wherein the data input controller samples an input data signal to produce the data signal; and a variable sampling circuit wherein the variable sampling circuit changes the sampling rate of the input data signal under the control of the transmit controller.

13. An apparatus for producing a variable data rate transmit signal within a spread spectrum communication system, in which a transmit signal is formed by multiplying a data signal by a PN code, the apparatus comprising:

a PN code generator for generating PN codes of different lengths;

a PN code generator control input for accepting a PN code generator control signal, whereby the length of the spreading code is adjusted;

a transmit controller whereby a PN code generator control is generated; and a Time Division Duplex variable transmit time slice controller whereby the number of time slices allotted to the transmit signal is adjusted.

14. An apparatus for producing a variable data rate transmit signal within a spread spectrum communication system, in which a transmit signal is formed by multiplying a data signal by a PN code, the apparatus comprising:

a PN code generator for generating PN codes of different lengths;

a PN code generator control input for accepting a PN code generator control signal, whereby the length of the spreading code is adjusted;

a data input controller for accepting the data signal and generating an input data rate signal, whereby the arrival rate of the data signal to the data input controller is represented;

a transmit controller whereby a PN code generator control signal is generated;

a data rate input within the transmit controller for accepting the input data rate signal;

circuitry within the transmit controller whereby the PN code is adjusted based on the input data rate signal;

a data input queue whereby the data signal to be transmitted is queued;

a data queue length signal provided to the transmit controller;

a data queue length input within the transmit controller for receiving the data queue length signal; and circuitry within the transmit controller for generating a PN code generator control signal based on the length of the data queue.

15. An apparatus for producing a variable data rate transmit signal within a spread spectrum communication system, in which a transmit signal is formed by multiplying a data signal by a PN code, the apparatus comprising:

a PN code generator for generating PN codes of different lengths;

a PN code generator control input for accepting a PN code generator control signal, whereby the length of the spreading code is adjusted;

a data input controller for accepting the data signal and generating an input data rate signal, whereby the arrival rate of the data signal to the data input controller is represented;

a transmit controller whereby a PN code generator control signal is generated;

a data rate input within the transmit controller for accepting the input data rate signal;

circuitry within the transmit controller whereby the PN code is adjusted based on the input data rate signal;

a data signal input queue whereby the data to be transmitted is queued;

a data queue length signal provided by the data input controller to the transmit controller;

a data queue length input within the transmit controller for receiving the data queue length signal; and circuitry within the transmit controller for generating a PN code generator control signal based on the rate of change of the length of the data queue.

16. A method for adjusting the amount of data transmitted in a Time Division Duplex communication system having a duty cycle for transmitting data and a duty cycle for receiving data, the method comprising the steps of:

receiving data to be transmitted by the Time Division Duplex communication system;

adjusting the transmit duty cycle based on arrival rate of data to be transmitted, to the Time Division Duplex communication system; and adjusting the amount of data transmitted in proportion to the changed transmit duty cycle.

17. An apparatus for producing a variable data rate transmit signal within a spread spectrum communication system, in which a transmit signal is formed by multiplying a data signal by a PN code, the apparatus comprising:

a PN code generator for generating PN codes of different lengths;

a PN code generator control input for accepting a PN code generator control signal, whereby the length of the spreading code is adjusted;

a variable transmit duty cycle controller for controlling a Time Division Duplex protocol;

a control input within the variable transmit duty cycle controller for accepting a variable transmit duty cycle controller control signal; and a transmit controller, wherein a variable duty cycle controller control signal is produced, and wherein a PN code generator control signal is generated.

* * * * *